United States Patent
Chinitz

(10) Patent No.: US 10,208,846 B2
(45) Date of Patent: Feb. 19, 2019

(54) AXLE ASSEMBLY HAVING A DRIVE PINION SUPPORT BEARING AND A METHOD OF ASSEMBLY

(71) Applicant: ArvinMeritor Technology, LLC, Troy, MI (US)

(72) Inventor: Steven Chinitz, Plymouth, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 80 days.

(21) Appl. No.: 15/455,401

(22) Filed: Mar. 10, 2017

(65) Prior Publication Data

US 2018/0259052 A1  Sep. 13, 2018

(51) Int. Cl.
| | |
|---|---|
| *F16H 48/08* | (2006.01) |
| *F16H 48/42* | (2012.01) |
| *B60K 17/36* | (2006.01) |
| *B60K 17/346* | (2006.01) |
| *F16H 48/38* | (2012.01) |

(52) U.S. Cl.
CPC ........... *F16H 48/42* (2013.01); *B60K 17/346* (2013.01); *B60K 17/36* (2013.01); *F16H 48/08* (2013.01); *B60Y 2410/1022* (2013.01); *F16H 2048/382* (2013.01); *F16H 2048/423* (2013.01)

(58) Field of Classification Search
None
See application file for complete search history.

(56) References Cited

U.S. PATENT DOCUMENTS

| | | | |
|---|---|---|---|
| 2,574,986 A | | 11/1951 | Schou |
| 3,315,544 A | * | 4/1967 | Wickman ............... F16H 37/08 475/136 |
| 4,452,331 A | | 6/1984 | Lunn et al. |
| 4,718,301 A | * | 1/1988 | Friedrich ............. B60K 17/351 192/58.41 |
| 6,581,745 B2 | | 6/2003 | Kanazawa |
| 6,648,788 B1 | | 11/2003 | Sullivan |
| 6,840,882 B2 | | 1/2005 | Oates et al. |
| 6,852,058 B2 | * | 2/2005 | Oates .................... B60K 17/36 475/221 |
| 6,918,851 B2 | | 7/2005 | Ziech et al. |
| RE39,323 E | * | 10/2006 | Oates .................... B60K 17/16 475/221 |

(Continued)

FOREIGN PATENT DOCUMENTS

| | | | | |
|---|---|---|---|---|
| EP | 14959000 A2 | | 1/2005 | |
| FR | 1417887 A | * | 11/1965 | ............ F16H 55/20 |
| WO | 2004009392 A1 | | 1/2004 | |

OTHER PUBLICATIONS

United States Patent and Trademark Office, U.S. Appl. No. 14/719,977, filed May 22, 2015.

(Continued)

*Primary Examiner* — Dirk Wright
(74) *Attorney, Agent, or Firm* — Brooks Kushman P.C.

(57) ABSTRACT

An axle assembly and a method of assembly. The axle assembly has a drive pinion, a through shaft, and at least one support bearing. The through shaft may extend through a drive pinion passage that may extend through the drive pinion. One or more support bearings may be disposed in the drive pinion passage and may rotatably support the drive pinion.

20 Claims, 5 Drawing Sheets

(56) References Cited

U.S. PATENT DOCUMENTS

| | | | |
|---|---|---|---|
| 7,115,057 B2* | 10/2006 | House | B60K 6/365 |
| | | | 475/5 |
| 7,211,017 B2 | 5/2007 | Green et al. | |
| 7,500,934 B2 | 3/2009 | Ziech | |
| 7,749,124 B2 | 7/2010 | Nakajima | |
| 8,480,531 B2 | 7/2013 | Pan et al. | |
| 9,816,603 B2* | 11/2017 | Hayes | F16H 57/0483 |
| 10,001,201 B2* | 6/2018 | Martin | B60K 17/346 |
| 2004/0176206 A1 | 9/2004 | Oates et al. | |

OTHER PUBLICATIONS

United States Patent and Trademark Office, U.S. Appl. No. 15/347,426, filed Nov. 9, 2016.
European Patent Office, Extended European Search Report for related Application No. 18156491.5-1012, dated Aug. 7, 2018, 10 pages.

* cited by examiner

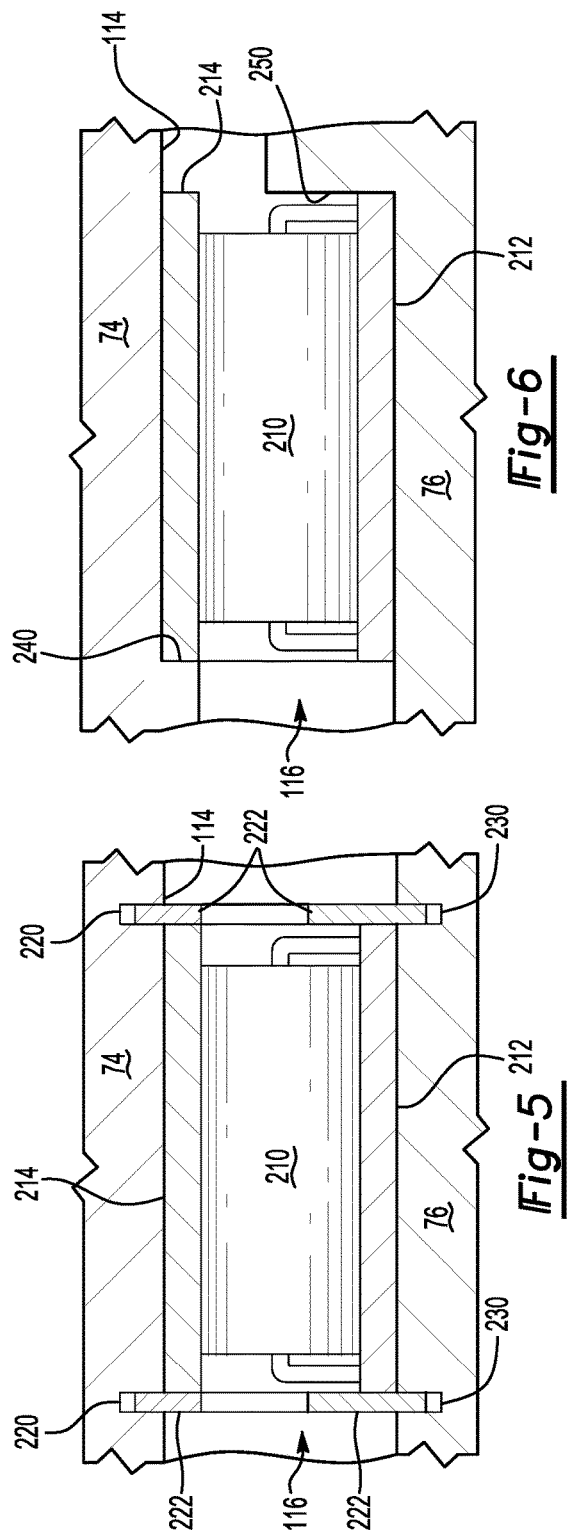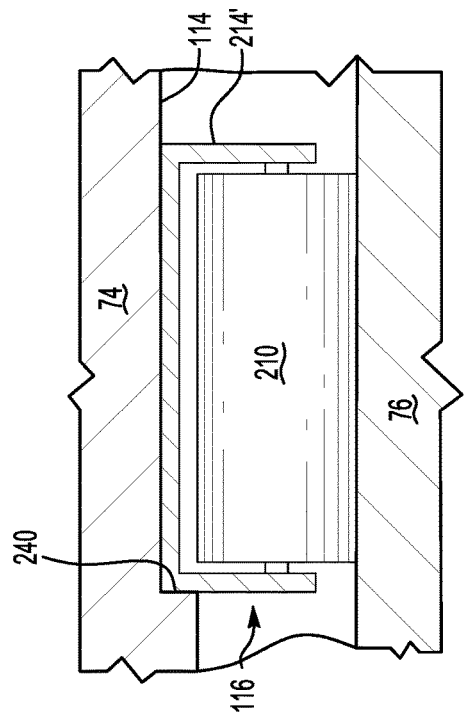

US 10,208,846 B2

AXLE ASSEMBLY HAVING A DRIVE PINION SUPPORT BEARING AND A METHOD OF ASSEMBLY

TECHNICAL FIELD

This disclosure relates to an axle assembly having at least one support bearing that is disposed in a drive pinion that rotatably supports a through shaft and a method of assembly.

BACKGROUND

A drive axle having a through shaft that extends through a pinion gear is disclosed in U.S. Pat. No. 6,648,788.

SUMMARY

In at least one embodiment, an axle assembly is provided. The axle assembly may include a drive pinion, a through shaft, and a support bearing. The drive pinion may be rotatable about a first axis. The drive pinion may have a drive pinion passage that extends around the first axis and through the drive pinion. The through shaft may extend through the drive pinion passage and may be rotatable about the first axis. The support bearing may be disposed in the drive pinion passage and may rotatably support the drive pinion.

In at least one embodiment, an axle assembly is provided. The axle assembly may include a drive pinion, a through shaft, a first support bearing, and a second support bearing. The drive pinion may be rotatable about a first axis. The drive pinion may have a gear portion, a shaft portion, and a drive pinion passage. The gear portion may have a set of teeth. The shaft portion may extend from the gear portion. The drive pinion passage may be defined by the shaft portion and the gear portion and may extend through the shaft portion and the gear portion. The drive pinion passage may be coaxially disposed with the first axis. The through shaft may extend through the drive pinion and may be received in the drive pinion passage. The through shaft may be rotatable about the first axis. The first support bearing may be disposed in a portion of the drive pinion passage that may be defined by the gear portion. The second support bearing may be disposed in a portion of the drive pinion passage that is defined by the shaft portion. The first support bearing and the second support bearing may rotatably support the drive pinion.

In at least one embodiment, a method of assembling an axle assembly is provided. The method may include positioning a first support bearing in a drive pinion passage of a drive pinion such that a through shaft extends through the first support bearing to rotatably support the drive pinion.

BRIEF DESCRIPTION OF THE DRAWINGS

FIGS. 5-7 are magnified section views of a portion of the differential carrier showing examples of a support bearing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
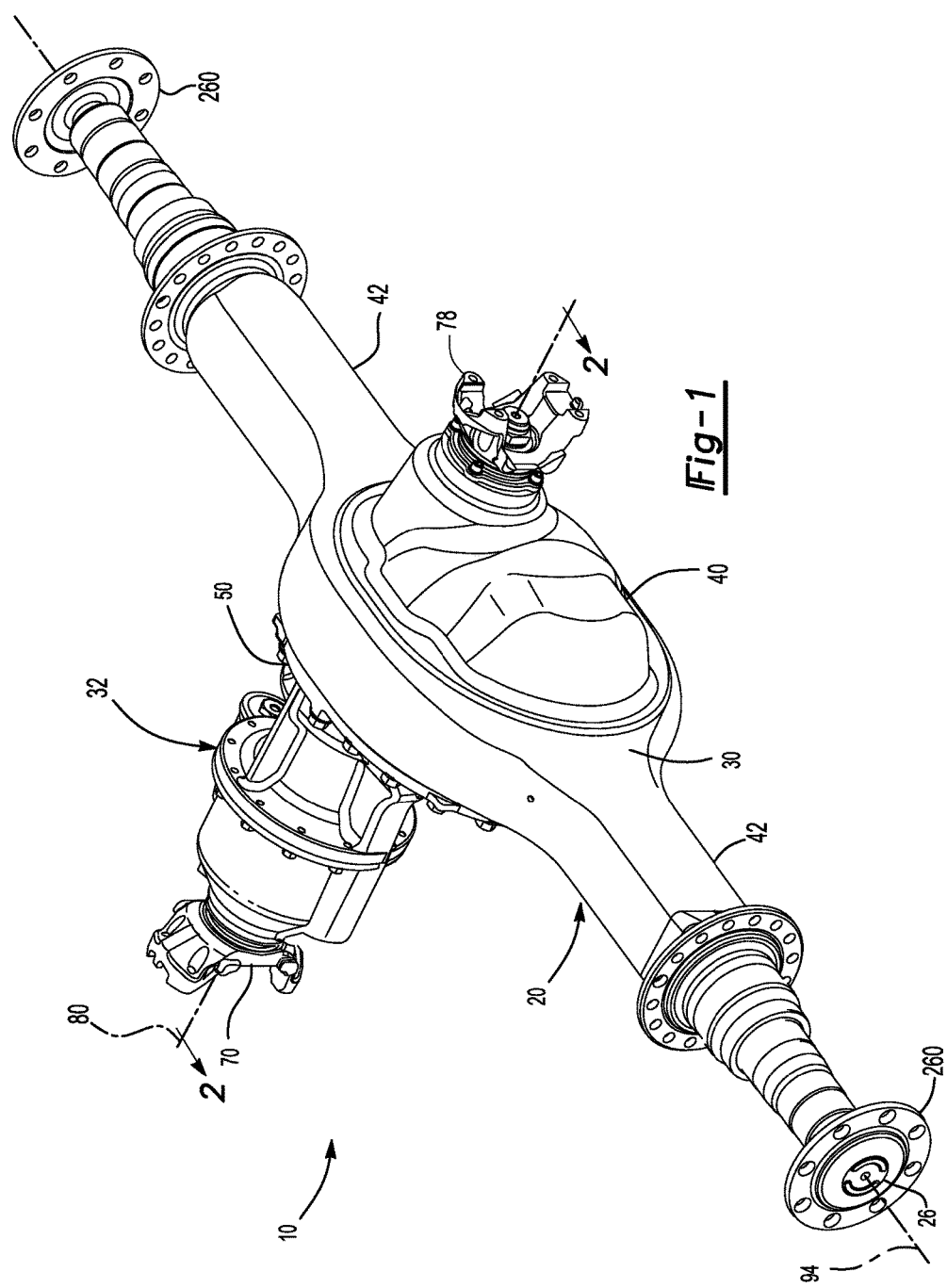
FIG. 1 is a perspective view of an axle assembly having a differential carrier that supports a differential assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown with reference to FIGS. 1 and 2, the axle assembly 10 may include a housing assembly 20, an interaxle differential unit 22, a differential assembly 24, and at least one axle shaft 26.

Referring to FIG. 1, the housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

The axle housing 30 may receive and support the axle shafts 26. In at least one configuration, the axle housing 30 may include a center portion 40 and at least one arm portion 42.

The center portion 40 may be disposed proximate the center of the axle housing 30. The center portion 40 may define a cavity that may receive the differential assembly 24. In addition, the center portion 40 may include a carrier mounting surface that may facilitate mounting of the differential carrier 32 to the axle housing 30. For example, the carrier mounting surface may have a set of holes that may be aligned with corresponding holes on the differential carrier 32. Each hole may receive a fastener, such as a bolt, that may couple the differential carrier 32 to the axle housing 30.

One or more arm portions 42 may extend from the center portion 40. For example, two arm portions 42 may extend in opposite directions from the center portion 40 and away from the differential assembly 24. The arm portions 42 may have substantially similar configurations. For example, the arm portions 42 may each have a hollow configuration or tubular configuration that may extend around the corresponding axle shaft 26 and may help separate or isolate the axle shaft 26 from the surrounding environment. An arm portion 42 or a portion thereof may be integrally formed with the center portion 40. Alternatively, an arm portion 42 may be separate from the center portion 40.

Figure 2:
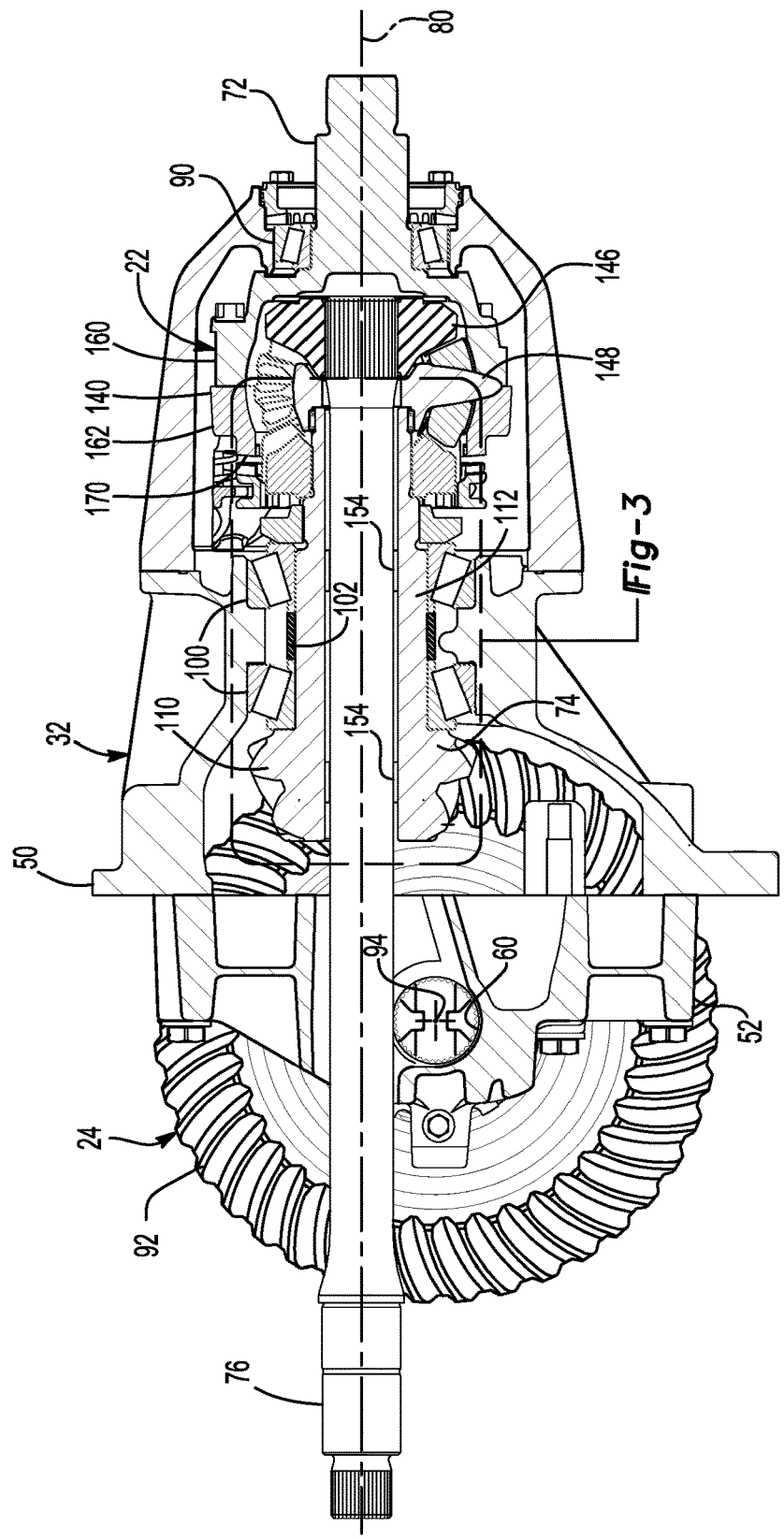
FIG. 2 is a section view of the differential carrier along section line 2-2.

Referring to FIGS. 1 and 2, the differential carrier 32, which may also be called a carrier housing, may be mounted to the center portion 40 of the axle housing 30. The differential carrier 32 may receive the interaxle differential unit 22 and may support various components associated with the differential assembly 24. As is best shown in FIG. 2, the differential carrier 32 may have a flange portion 50 and one or more bearing supports 52.

Referring to FIGS. 1 and 2, the flange portion 50 may facilitate mounting of the differential carrier 32 to the axle housing 30. For example, the flange portion 50 may be disposed on the carrier mounting surface of the axle housing 30 and may have a set of holes that may receive fasteners as previously discussed.

Referring to FIG. 2, the bearing support 52 may support a roller bearing assembly 60 that may rotatably support the differential assembly 24. For example, two bearing supports 52 may be provided and may be located on opposite sides of the differential assembly 24. The bearing support 52 may be provided in various configurations. For example, a bearing support 52 may include a pair of legs that extend from the differential carrier 32. A bearing cap may be mounted to the legs and may arch over a roller bearing assembly 60. In such a configuration, the bearing support 52 and bearing cap may cooperate to extend around, receive, and secure the roller bearing assembly 60. As another example, the bearing support 52 may be received in a roller bearing assembly 60 which in turn may support the differential assembly 24.

Referring to FIGS. 1-4, additional components that may be associated with the differential assembly 24 may include an input yoke 70, an input shaft 72, a drive pinion 74, a through shaft 76, and an output yoke 78.

Referring to FIG. 1, the input yoke 70 may facilitate coupling of the axle assembly 10 to a torque source. For example, the input yoke 70 may be coupled to the drive shaft or a prop shaft. The input yoke 70 may be disposed on the input shaft 72, the input shaft 72 being best shown in FIGS. 2 and 4. For example, the input yoke 70 may have an opening that receives the input shaft 72 and may be secured to the input shaft 72 with a fastener, such as a nut.

Figure 4:
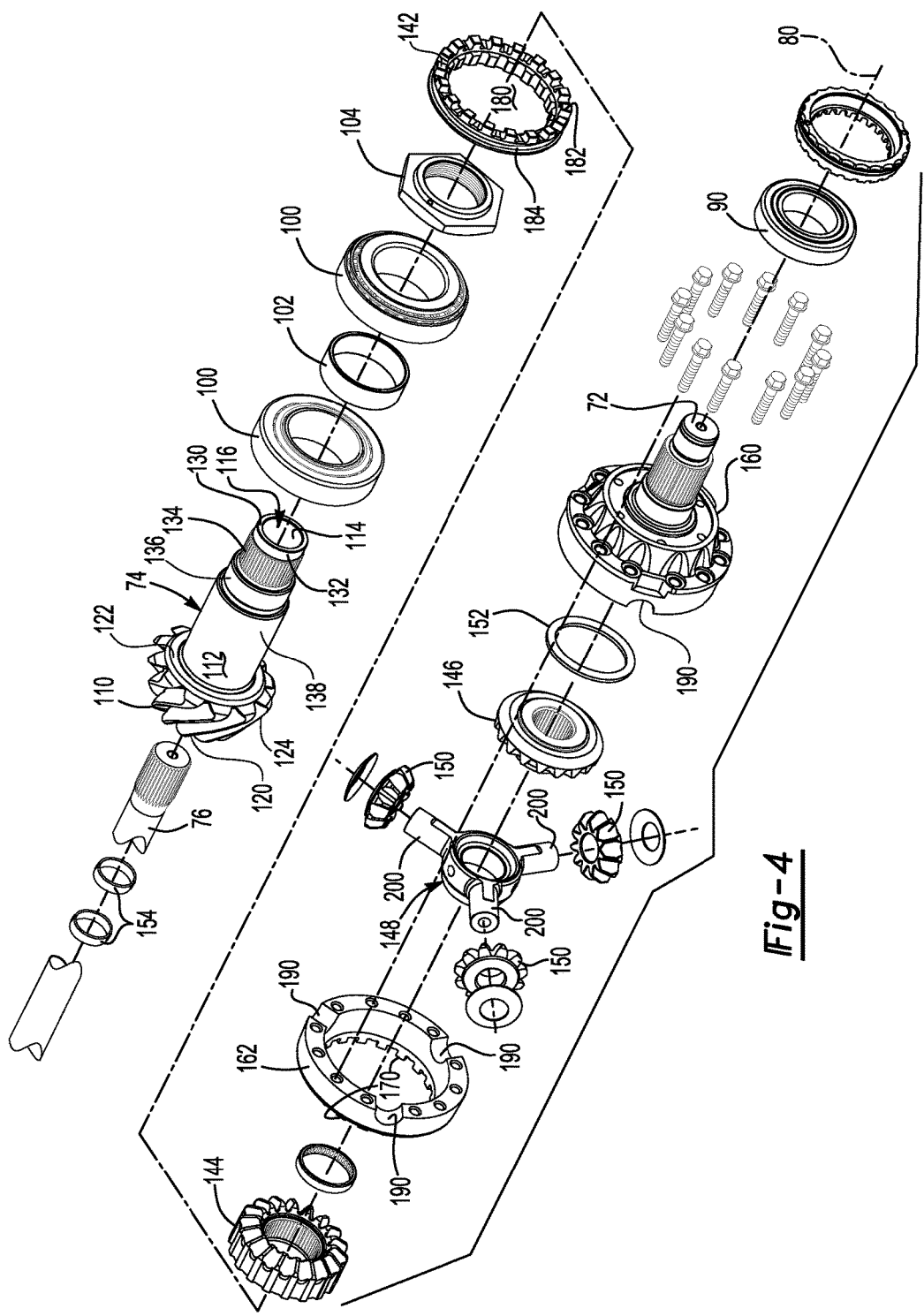
FIG. 4 is an exploded view of a portion of the differential carrier.

Referring to FIGS. 2 and 4, the input shaft 72 may extend along and may be configured to rotate about a first axis 80. For example, the input shaft 72 may be rotatably supported by one or more roller bearing assemblies 90 that may be disposed on the differential carrier 32. The input shaft 72 may be part of the interaxle differential unit 22 or may be operatively connected to the interaxle differential unit 22. For instance, the input shaft 72 may be integrally formed with a case of the interaxle differential unit 22 or may be provided as a separate component that is fixedly coupled to the case in one or more embodiments.

Referring to FIG. 2, the drive pinion 74 may provide torque to a ring gear 92 that may be provided with the differential assembly 24. The drive pinion 74 may extend along and may be rotatable about a first axis 80. The ring gear 92 may rotate about a second axis 94.

The drive pinion 74 may be coaxially disposed with the input shaft 72 and the through shaft 76. In addition, the drive pinion 74 may be spaced apart from the input shaft 72 and the through shaft 76.

Figure 3:
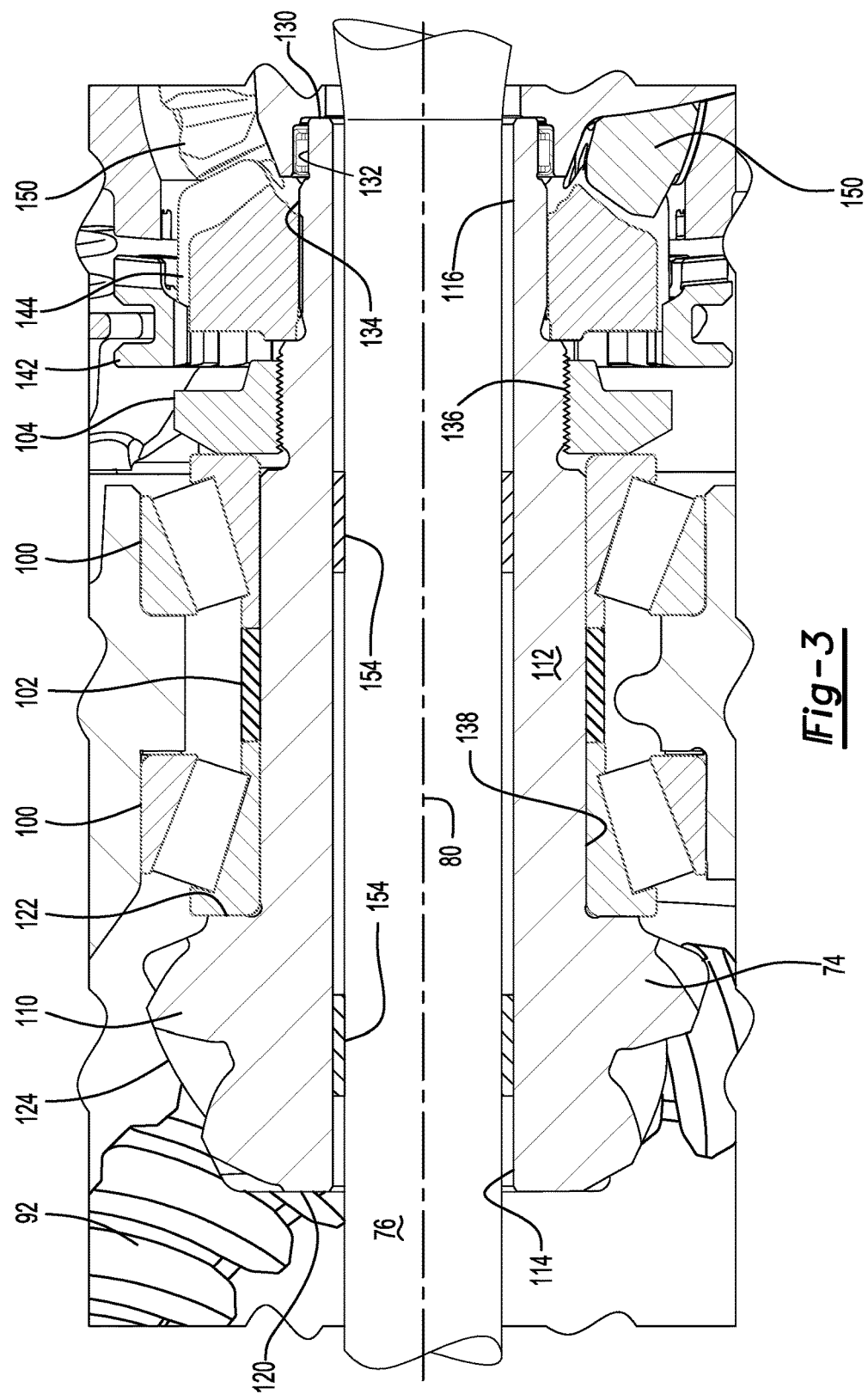
FIG. 3 is a magnified view of a portion of FIG. 2.

Referring to FIGS. 2 and 3, the drive pinion 74 may be rotatably supported by one or more roller bearing assemblies 100 that may be disposed on the differential carrier 32. In FIGS. 2 and 3, two roller bearing assemblies 100 are shown that are spaced apart from each other and separated by a spacer ring 102 that may extend around the drive pinion 74. A preload nut 104 may be threaded onto the drive pinion 74 and may be rotated to exert a desired preload force on the roller bearing assemblies 100. In at least one configuration, the drive pinion 74 may include a gear portion 110 and a shaft portion 112. The gear portion 110 and the shaft portion 112 may cooperate to define an inner drive pinion surface 114 that may define a drive pinion passage 116.

Referring to FIGS. 3 and 4, the inner drive pinion surface 114 may be spaced apart from the first axis 80 and may be radially disposed with respect to the first axis 80. For example, the inner drive pinion surface 114 may be an inside circumference of the drive pinion 74. The inner drive pinion surface 114 may be spaced apart from and may not engage the through shaft 76. The inner drive pinion surface 114 may extend completely through the drive pinion 74 and may define the drive pinion passage 116.

The drive pinion passage 116 may extend through the drive pinion 74. In addition, the drive pinion passage 116 may extend around and along the first axis 80. As such, the drive pinion passage 116 may be coaxially disposed with the first axis 80. The through shaft 76 may extend through the drive pinion passage 116.

The gear portion 110 may be disposed at an end of the drive pinion 74. The gear portion 110 may be integrally formed with the shaft portion 112 or may be provided as a separate component that may be fixedly disposed on the shaft portion 112 in one or more embodiments. The gear portion 110 may extend outwardly from the first axis 80 and may include a first gear portion end surface 120, a second gear portion end surface 122, and a set of teeth 124.

The first gear portion end surface 120 may be disposed at a first end of the drive pinion 74. For example, the first gear portion end surface 120 may be disposed at a narrow or tapered end of the gear portion 110. The first gear portion end surface 120 may be disposed substantially perpendicular to the first axis 80 in one or more embodiments.

The second gear portion end surface 122 may be disposed opposite the first gear portion end surface 120. For example, the second gear portion end surface 122 may be disposed adjacent to a roller bearing assembly 100 and may extend away from the first axis 80 further than the first gear portion end surface 120. The shaft portion 112 may extend from the second gear portion end surface 122. The second gear portion end surface 122 or a portion thereof may be disposed substantially perpendicular to the first axis 80 in one or more embodiments.

The set of teeth 124 may mate with corresponding teeth on the ring gear 92. The set of teeth 124 may extend between the first gear portion end surface 120 and the second gear portion end surface 122 or extend from the first gear portion end surface 120 to the second gear portion end surface 122. In addition, the teeth 124 may be disposed radially opposite the drive pinion passage 116 and may extend away from the first axis 80. The set of teeth 124 may be arranged around the first axis 80. The teeth 124 may be provided in a repeating pattern and may have any suitable configuration. For instance, the teeth 124 may be configured as hypoid gear teeth or bevel gear teeth, such as may be provided with a plain bevel gear or a spiral bevel gear. As such, the gear portion 110 may have a generally tapered or truncated conical shape that may become narrower (i.e., may be disposed closer to the first axis 80) in an inboard direction that extends along the first axis 80 toward the ring gear 92.

Referring to FIGS. 2-4, the shaft portion 112 may extend from the gear portion 110. For example, the shaft portion 112 may extend from the gear portion 110 to the interaxle differential unit 22. As is best shown in FIGS. 3 and 4, the shaft portion 112 may include a shaft portion end surface 130, a first drive pinion outer surface 132, a drive pinion spline 134, a second drive pinion outer surface 136, and a third drive pinion outer surface 138.

The shaft portion end surface 130 may be disposed at a second end of the drive pinion 74 that may be disposed opposite the first end and opposite the gear portion 110. The shaft portion 112 may extend from the shaft portion end surface 130 to the gear portion 110. For example, the shaft portion may extend from the shaft portion end surface 130 to the second gear portion end surface 122. The shaft portion end surface 130 may extend from the inner drive pinion surface 114 to the first drive pinion outer surface 132.

The first drive pinion outer surface 132 may extend from the shaft portion end surface 130 toward or to the drive pinion spline 134. In at least one embodiment, the first drive pinion outer surface 132 may face away from the first axis 80 and may be an outside circumference of a portion of the shaft portion 112.

The drive pinion spline 134 may be axially disposed between the first drive pinion outer surface 132 and the second drive pinion outer surface 136. The drive pinion spline 134 may include a plurality of spline teeth. The spline teeth may be disposed substantially parallel to the first axis 80 and may mate with a corresponding spline on a second side gear of the interaxle differential unit 22 as will be discussed in more detail below.

The second drive pinion outer surface 136 may be axially disposed between the drive pinion spline 134 and the third drive pinion outer surface 138. The second drive pinion outer surface 136 may have a larger diameter than the first drive pinion outer surface 132 and the drive pinion spline 134. The second drive pinion outer surface 136 may have one or more threads that may extend around the first axis 80 that may mate with corresponding threads of the preload nut 104.

The third drive pinion outer surface 138 may be axially disposed between the second drive pinion outer surface 136 and the second gear portion end surface 122. The third drive pinion outer surface 138 may have a larger diameter than the second drive pinion outer surface 136. The third drive pinion outer surface 138 may be disposed proximate and may engage one or more roller bearing assemblies 100.

Referring to FIGS. 2 and 3, the through shaft 76 may extend along and may be rotatable about the first axis 80. The through shaft 76 may be rotatably supported by one or more support bearings that may be disposed in the drive pinion 74 as will be discussed in more detail below. The through shaft 76 may extend through the drive pinion 74 and the drive pinion passage 116. In addition, the through shaft 76 may extend through a spider of the interaxle differential unit 22 as will be discussed in more detail below. The through shaft 76 may be coupled to the interaxle differential unit 22 at a first end. For example, the through shaft 76 may be fixedly coupled to a second side gear of the interaxle differential unit 22 at the first end. The through shaft 76 may be fixedly coupled to the output yoke 78 at a second end that may be disposed opposite the first end.

Referring to FIG. 1, the output yoke 78 may facilitate coupling of the through shaft 76 to a second axle assembly that may be disposed in series with the axle assembly 10. For instance, the output yoke 78 may be coupled to a connecting shaft, such as a prop shaft, which in turn may be operatively connected to the second axle assembly.

Referring to FIG. 2, the interaxle differential unit 22 may operatively connect the input shaft 72 to the drive pinion 74 and/or the through shaft 76. The interaxle differential unit 22 may compensate for speed differences between different drive axle assemblies, such as speed differences between the axle assembly 10 and a second axle assembly. As is best shown with reference to FIGS. 2 and 4, the interaxle differential unit 22 may include a case 140, a clutch collar 142, a first side gear 144, a second side gear 146, a spider 148, a plurality of pinion gears 150, a thrust bearing 152, and one or more support bearings 154.

The case 140 may be configured to receive components of the interaxle differential unit 22. In addition, the case 140 may be rotatable about the first axis 80. In at least one configuration, the case 140 may include a first case portion 160 and a second case portion 162 that may cooperate to at least partially define a cavity. The cavity may at least partially receive the first side gear 144, second side gear 146, spider 148, pinion gears 150, and the thrust bearing 152.

Referring to FIG. 4, the first case portion 160 may receive at least a portion of the interaxle differential unit 22. In the configuration shown, the first case portion is configured as a unitary or one-piece component that includes the input shaft 72. The first case portion 160 may cooperate with the second case portion 162 to define a cavity that may at least partially receive the interaxle differential unit 22. The first case portion 160 may be mounted to the second case portion 162 in any suitable manner, such as with a plurality of fasteners such as bolts.

The second case portion 162 may be disposed opposite the first case portion 160 and may receive at least a portion of the interaxle differential unit 22. The second case portion 162 may extend around the first axis 80 and may include a face gear 170.

Referring to FIG. 4, the face gear 170 may be disposed opposite the first case portion 160. The face gear 170 may include a plurality of teeth that may be arranged around the first axis 80. The teeth may extend away from the first case portion 160 toward a clutch collar 142.

Referring to FIGS. 3 and 4, the clutch collar 142, which may also be referred to as a lock collar, may be moveably disposed on the first side gear 144. The clutch collar 142 may move axially or move along the first axis 80 between an unlocked position and a locked position to disengage and engage the face gear 170. As is best shown in FIG. 4, the clutch collar 142 may be generally ring-shaped and may include a clutch collar hole 180, a clutch collar face gear 182, and a clutch collar groove 184.

The clutch collar hole 180 may extend through the clutch collar 142 and extend around the first axis 80. The clutch collar hole 180 may receive the first side gear 144. For example, the clutch collar 142 may have a spline that may extend into the clutch collar hole 180 and toward the first axis 80 and may mate with a corresponding spline on the first side gear 144. As such, the mating splines may allow the clutch collar 142 to move in an axial direction or along the first axis 80 while inhibiting rotation of the clutch collar 142 about the first axis 80 with respect to the first side gear 144.

The clutch collar face gear 182 may include a set of teeth that may face toward the interaxle differential unit 22. The set of teeth may be arranged around the first axis 80 and may selectively engage the teeth of the face gear 170 of the second case portion 162 depending on the position of the clutch collar 142.

The clutch collar groove 184 may face away from the first axis 80 and may extend around the first axis 80. The clutch collar groove 184 may receive a shift fork that may operatively connect the clutch collar 142 to an actuator. The actuator may move the clutch collar 142 between and unlocked position and a locked position. The clutch collar face gear 182 may not engage the face gear 170 when the clutch collar 142 is in the unlocked position. As such, the first side gear 144 and drive pinion 74 may be permitted to rotate with respect to the case 140. The clutch collar face gear 182 may engage and mesh with the face gear 170 when the clutch collar 142 is in the locked position, thereby inhibiting the first side gear 144 from rotating with respect to the case 140.

Referring to FIG. 4, the first case portion 160 may cooperate with the second case portion 162 to define one or more spider shaft holes 190. A spider shaft hole 190 may receive a shaft of the spider 148. In the configuration shown, three spider shaft holes 190 are depicted; however, it is contemplated that a greater or lesser number of spider shaft holes 190 may be provided.

Referring to FIGS. 3 and 4, the first side gear 144 may be disposed on the drive pinion 74. For example, the first side gear 144 may be disposed around the first axis 80 and may have a center bore that may receive the shaft portion 112 of the drive pinion 74. The center bore may include a spline that may receive and engage the drive pinion spline 134. As such, the first side gear 144 may not rotate about the first axis 80 with respect to the drive pinion spline 134 and the drive pinion 74.

Referring to FIGS. 2 and 4, the second side gear 146 may be disposed on the through shaft 76. For example, the second side gear 146 may be disposed around the first axis 80 and may have a center bore that may receive the through shaft 76. The center bore may include a spline that may receive and engage a corresponding spline on the through shaft 76. As such, the second side gear 146 may not rotate about the first axis 80 with respect to the through shaft 76.

Referring to FIGS. 2 and 4, the spider 148 may be fixedly positioned with respect to the case 140 and may be rotatably disposed on the drive pinion 74. The spider 148 may be axially positioned between the input shaft 72 and the drive pinion 74. The through shaft 76 may extend through the spider 148 such that the spider 148 is spaced apart from and does not engage the through shaft 76. As such, the spider 148 may be rotatable with respect to the through shaft 76. The spider 148 may have one or more spider shafts 200. Each spider shaft 200 may extend away from the first axis 80. An end of each spider shaft 200 may be received in a corresponding spider shaft hole 190 of the case 140.

Referring to FIG. 4, a pinion gear 150 may be rotatably disposed on a corresponding spider shaft 200. Each pinion gear 150 may have teeth that may mesh with teeth on the first side gear 144 and the second side gear 146.

The thrust bearing 152 may be disposed between the case 140 and the second side gear 146. The thrust bearing 152 may rotatably support the second side gear 146 with respect to the first case portion 160.

Referring to FIGS. 2-6, one or more support bearings 154 may rotatably support the drive pinion 74. The support bearing(s) 154 may be disposed in the drive pinion passage 116. In FIGS. 2-4, two support bearings 154 are shown; however, it is contemplated that a greater or lesser number of support bearings 154 may be provided. For convenience in reference, the support bearing 154 that is disposed inside the gear portion 110 of the drive pinion 74 may be referred to as a first support bearing and the support bearing 154 that is disposed inside the shaft portion 112 of the drive pinion 74 may be referred to as a second support bearing. As such, the first support bearing 154 may be disposed in a portion of the drive pinion passage 116 that is defined by the gear portion 110 (i.e., the first support bearing may be axially positioned between the first gear portion end surface 120 and the second gear portion end surface 122) while the second support bearing 154 may be disposed in a portion of the drive pinion passage 116 that may be defined by the shaft portion 112. The first support bearing may be spaced apart from and may not engage the second support bearing. For instance, second support bearing 154 may be axially positioned midway between the shaft portion end surface 130 and the second gear portion end surface 122 to inhibit deflection of the shaft portion 112.

The support bearings 154 may inhibit bending or deflection of the drive pinion 74 with respect to the through shaft 76. For instance, the support bearings 154 may inhibit bending or deflection of the inner drive pinion surface 114 toward the through shaft 76. Inhibiting bending or deflection of the gear portion 110 may help maintain a desired contact pattern between the teeth 124 of the drive pinion 74 and the teeth of the ring gear 92, thereby reducing noise and improving the durability or useful life of the drive pinion 74 and/or the ring gear 92.

The support bearing 154 may extend continuously around the through shaft 76 and may extend from the through shaft 76 to the inner drive pinion surface 114. The support bearing 154 may have any suitable configuration. For instance, the support bearing 154 may be configured as a roller bearing assembly that may include a plurality of rolling elements 210 as is best shown in FIGS. 5 and 6. In FIG. 5, the rolling elements 210 are disposed between an inner race 212 and an outer race 214. The inner race 212 may engage the through shaft 76 while the outer race 214 may engage the inner drive pinion surface 114. In FIG. 6, the rolling elements 210 may be received in an outer race 214' that may be configured as a cup and the rolling elements 210 may engage the drive pinion 74 or the through shaft 76. For instance, the cup may be disposed on the inner drive pinion surface 114 while the rolling elements 210 may engage an outside surface or outside circumference of the through shaft 76. The rolling elements 210 may have any suitable configuration. For instance, the rolling elements 210 may be configured as needle bearings that may or may not be tapered or as ball bearings in one or more embodiments. It is also contemplated that the inner race and/or the outer race could be omitted and the rolling elements 210 could engage the through shaft 76 and/or the inner drive pinion surface 114. Alternatively, the support bearing 154 may be configured as a journal bearing that may not include a plurality of rolling elements.

The support bearing 154 may be secured to the drive pinion 74 or the through shaft 76 in a manner that limits or prevents axial movement during assembly, after assembly, or both. For instance, one or more support bearings 154 may be positioned in the drive pinion passage 116 of the drive pinion 74 in a manner that inhibits movement of the support bearings 154 along the first axis 80 in at least one axial direction. A support bearing 154 may be prevented from moving along the first axis 80 in the direction that the through shaft 76 moves when the through shaft 76 is inserted into the drive pinion passage 116. As another example, one or more support bearings 154 may be positioned on the through shaft 76 in a manner that inhibits axial movement of the support bearings 154 along the through shaft 76 in at least one axial direction. A support bearing 154 may be prevented from moving along the through shaft 76 in an opposite direction in which the through shaft 76 moves when the through shaft 76 is inserted into the drive pinion passage 116. Various techniques and assembly method steps described below may be employed with a single support bearing or multiple support bearings.

One technique for securing a support bearing 154 may employ press fitting or an interference fit. For instance, the support bearing 154 may be press fit against the drive pinion 74 at a predetermined location inside the drive pinion passage 116. As such, the support bearing 154 may be inhibited from moving along the first axis 80 when the through shaft 76 is inserted into the drive pinion passage 116 and inserted through the hole in the support bearing 154. Alternatively, the support bearing 154 may be press fit against the through shaft 76 at a predetermined location. As such, the through shaft 76 may extend through the support bearing 154 and the support bearing 154 may be inhibited from moving along the first axis 80 when the through shaft 76 is subsequently inserted into the drive pinion passage 116 and through the drive pinion 74.

Referring to FIG. 5, another technique for securing a support bearing 154 is shown. In FIG. 5, the drive pinion 74 may have one or more drive pinion grooves 220 that may receive a retention feature 222. The drive pinion groove 220 may extend from the drive pinion passage 116 in a direction that extends away from the first axis 80. The drive pinion groove 220 may have an annular configuration. The retention feature 222 may be partially received in the drive pinion groove 220 and may extend into the drive pinion passage 116 and toward the first axis 80 to inhibit axial movement of the support bearing 154. For example, the retention feature 222 may engage the support bearing 154 to inhibit axial movement of the support bearing 154 with respect to the drive pinion 74.

Alternatively or additionally, the through shaft 76 may have one or more through shaft grooves 230. The through shaft groove 230 may extend toward the first axis 80 and may have an annular configuration. The through shaft groove 230 may receive a retention feature 222. A portion of the retention feature 222 may extend into the drive pinion passage 116 and may inhibit axial movement of the support bearing 154.

If retention features 222 are provided on both the drive pinion 74 and the through shaft 76, the retention features 222 may both engage the support bearing 154 or some float or clearance may be provided so that only one of the retention features 222 engages the support bearing 154 to accommodate manufacturing tolerances.

The retention feature 222 may have any suitable configuration. For instance, the retention feature 222 may be configured as a snap ring, washer, or one or more protrusions that may extend into the drive pinion passage 116.

Referring to FIG. 6, another technique for securing a support bearing 154 is shown. In FIG. 6, the drive pinion 74 may have a drive pinion shoulder 240. The drive pinion shoulder 240 may be disposed in the drive pinion passage 116. The drive pinion shoulder 240 may have a smaller diameter than an adjacent portion of the drive pinion passage 116 that receives the support bearing 154. The drive pinion shoulder 240 may engage the support bearing 154 to inhibit axial movement of the support bearing 154 with respect to the drive pinion 74 and toward the drive pinion shoulder 240, or to the left from the perspective shown in FIG. 6.

Alternatively or additionally, the through shaft 76 may have a through shaft shoulder 250. The through shaft shoulder 250 may be received in the drive pinion passage 116. The through shaft shoulder 250 may have a larger diameter than and adjacent portion of the through shaft 76 that is received in the support bearing 154. The through shaft shoulder 250 may engage the support bearing 154 to inhibit axial movement of the support bearing 154 with respect to the through shaft 76 and toward the through shaft shoulder 250, or to the right from the perspective shown in FIG. 6.

If shoulders are provided on both the drive pinion 74 and the through shaft 76, the drive pinion shoulder 240 and the through shaft shoulder 250 may both engage the support bearing 154 or some float or clearance may be provided so that only one of the shoulders engages the support bearing 154 to accommodate manufacturing tolerances.

Referring to FIG. 7, an example of a configuration in which a shoulder is omitted is shown. FIG. 7 omits the shoulder on the through shaft 76 and shows a support bearing 154 having an outer race configured as a drawn cup. It is contemplated that the support bearing 154 could also omit the outer race and have an inner race configured as a drawn cup, in which case the shoulder on the drive pinion 74 could be omitted and the shoulder on the through shaft 76 could be maintained.

The techniques for securing a support bearing 154 may be employed with a support bearing 154 that is configured as a journal bearing or a roller bearing assembly. In addition, the techniques may be employed for securing a support bearing 154 that is disposed inside the gear portion 110 or inside the shaft portion 112 of the drive pinion 74.

The support bearing 154 may help inhibit bending or deflection of the drive pinion 74 with respect to the first axis 80 and the through shaft 76. As such, the support bearing 154 may help maintain alignment, improve stability, and/or reduce vibration. In addition, providing one or more support bearings 154 inside the drive pinion 74 may provide a reduced package space as compared to a drive pinion 74 that is supported by an external bearing, such as bearing that is disposed on a cylindrical spigot that may extend from the gear portion 110 and may be disposed opposite the shaft portion 112. A spigot and associated spigot bearing increase the length and weight of the drive pinion and may require additional features to support the spigot bearing, thereby increasing cost, complexity and weight.

Referring to FIG. 2, the differential assembly 24 may be disposed in the center portion 40 of the housing assembly 20. The differential assembly 24 may transmit torque to the vehicle traction wheel assemblies and permit the traction wheel assemblies to rotate at different velocities. An abbreviated discussion of the operation of the differential assembly 24 follows with reference to FIGS. 1 and 2, beginning with the input yoke 70 shown in FIG. 1.

The input yoke 70 may be coupled to a vehicle drivetrain component, such as a drive shaft, that may be coupled to an output of a vehicle transmission or transfer case, which in turn may receive torque from a vehicle power source, such as an engine or motor. Alternatively, the input yoke 70 may be operatively connected to an output of another axle assembly. The input yoke 70 may be operatively connected to the input shaft 72, which in turn may be operatively connected to the drive pinion 74. The drive pinion 74 may provide torque to the ring gear 92 of the differential assembly 24. The differential assembly 24 may be operatively connected to the axle shafts 26 and may permit the axle shaft 26 to rotate at different rotational speeds in a manner known by those skilled in the art. As such, the differential assembly 24 may receive torque via the ring gear 92 and provide torque to the axle shafts 26.

Referring to FIG. 1, the axle shafts 26 may transmit torque from the differential assembly 24 to corresponding traction wheel assemblies. For example, two axle shafts 26 may be provided such that each axle shaft 26 extends through a different arm portion 42 of axle housing 30. The axle shafts 26 may extend along and may be rotated about the second axis 94 by the differential assembly 24. Each axle shaft 26 may have a first end and a second end. The first end may be operatively connected to the differential assembly 24. The second end may be disposed opposite the first end and may be operatively connected to a wheel end assembly that may have a wheel hub that may support a wheel. As shown in FIG. 1, an axle flange 260 may be disposed proximate the second end of the axle shaft 26 and may facilitate coupling of the axle shaft 26 to the wheel hub.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a drive pinion that is rotatable about a first axis, the drive pinion having a drive pinion passage that extends around the first axis and through the drive pinion;
a through shaft that extends through the drive pinion passage and is rotatable about the first axis; and
a support bearing that is disposed in the drive pinion passage and that rotatably supports the drive pinion, wherein the through shaft further comprises a through shaft shoulder that engages the support bearing to inhibit axial movement of the support bearing with respect to the through shaft.

2. The axle assembly of claim 1 wherein the support bearing extends continuously around the through shaft and extends from the through shaft to the drive pinion.

3. The axle assembly of claim 1 wherein the drive pinion has an inner drive pinion surface that defines the drive pinion passage, wherein the support bearing inhibits bending of the inner drive pinion surface toward the through shaft.

4. The axle assembly of claim 1 wherein drive pinion includes a gear portion and a shaft portion that extends from the gear portion, wherein the gear portion has a set of teeth that are arranged around the first axis and that are disposed opposite the drive pinion passage and the support bearing is disposed in the gear portion.

5. The axle assembly of claim 4 wherein the gear portion has a first gear portion end surface that is disposed at an end of the drive pinion and a second gear portion end surface that is disposed opposite the first gear portion end surface, wherein the support bearing is axially positioned between the first gear portion end surface and the second gear portion end surface.

6. The axle assembly of claim 1 wherein the drive pinion further comprises a drive pinion shoulder disposed in the drive pinion passage, wherein the drive pinion shoulder engages the support bearing to inhibit axial movement of the support bearing.

7. The axle assembly of claim 6 wherein the drive pinion has a gear portion that has a first gear portion end surface that is disposed at an end of the drive pinion, a second gear portion end surface that is disposed opposite the first gear portion end surface, and a set of teeth that extend from the first gear portion end surface to the second gear portion end surface, wherein the drive pinion shoulder and the support bearing are axially positioned between the first gear portion end surface and the second gear portion end surface and the drive pinion shoulder inhibits axial movement of the support bearing toward the first gear portion end surface.

8. The axle assembly of claim 1 wherein the through shaft shoulder and the support bearing are disposed inside a gear portion of the drive pinion.

9. An axle assembly comprising:
a drive pinion that is rotatable about a first axis, the drive pinion having a drive pinion passage that extends around the first axis and through the drive pinion and a drive pinion groove that extends from the drive pinion passage and away from the first axis;
a through shaft that extends through the drive pinion passage and is rotatable about the first axis; and
a support bearing that is disposed in the drive pinion passage and that rotatably supports the drive pinion, wherein the drive pinion groove receives a retention feature that extends into the drive pinion passage and inhibits axial movement of the support bearing.

10. An axle assembly comprising:
a drive pinion that is rotatable about a first axis, the drive pinion having a drive pinion passage that extends around the first axis and through the drive pinion;
a through shaft that extends through the drive pinion passage and is rotatable about the first axis, the through shaft having a through shaft groove that extends toward the first axis; and
a support bearing that is disposed in the drive pinion passage and that rotatably supports the drive pinion, wherein the through shaft groove receives a retention feature that extends into the drive pinion passage and inhibits axial movement of the support bearing.

11. The axle assembly of claim 1 wherein the support bearing is a roller bearing assembly.

12. The axle assembly of claim 1 wherein the support bearing is a journal bearing.

13. An axle assembly comprising:
a drive pinion that is rotatable about a first axis, the drive pinion including:
a gear portion that has a set of teeth, a first gear portion end surface that is disposed at a first end of the drive pinion, and a second gear portion end surface that is disposed opposite the first gear portion end surface;
a shaft portion that extends from the gear portion and has a shaft portion end surface that is disposed at a second end of the drive pinion that is disposed opposite the first end, wherein the shaft portion extends from the shaft portion end surface to the second gear portion end surface; and
a drive pinion passage that is defined by and extends through the shaft portion and the gear portion, wherein the drive pinion passage is coaxially disposed with the first axis;
a through shaft that extends through the drive pinion and is received in the drive pinion passage, the through shaft being rotatable about the first axis;
a first support bearing that is disposed in a portion of the drive pinion passage that is defined by the gear portion and that rotatably supports the drive pinion, wherein the first support bearing inhibits deflection of the gear portion with respect to the through shaft; and
a second support bearing that is disposed in a portion of the drive pinion passage that is defined by the shaft portion and that rotatably supports the drive pinion, wherein the second support bearing is axially positioned midway between the shaft portion end surface and the second gear portion end surface to inhibit deflection of the shaft portion with respect to the through shaft.

14. The axle assembly of claim 13 wherein the first support bearing is spaced apart from and does not engage the second support bearing.

15. The axle assembly of claim 13 wherein a retention feature is disposed in the drive pinion passage and inhibits axial movement of the first support bearing.

16. The axle assembly of claim 13 wherein a retention feature is disposed in the drive pinion passage and inhibits axial movement of the second support bearing.

17. An axle assembly comprising:
- a drive pinion that is rotatable about a first axis, the drive pinion having a first gear portion end surface that is disposed at an end of the drive pinion, a shaft portion end surface disposed at an end of the drive pinion that is opposite the first gear portion end surface, and a drive pinion passage that extends around the first axis and through the drive pinion from the first gear portion end surface to the shaft portion end surface;
- a through shaft that extends through the drive pinion passage and is rotatable about the first axis; and
- a support bearing that is axially positioned in the drive pinion passage between the first gear portion end surface and the shaft portion end surface, wherein the support bearing rotatably supports the drive pinion and the support bearing engages only the drive pinion and the through shaft.

18. The axle assembly of claim 17 wherein the drive pinion has a drive shaft shoulder that engages the support bearing to inhibit axial movement of the support bearing with respect to the drive pinion.

19. The axle assembly of claim 17 wherein the through shaft has a through shaft shoulder that engages the support bearing to inhibit axial movement of the support bearing with respect to the through shaft.

20. The axle assembly of claim 19 wherein the drive pinion has a drive shaft shoulder that engages the support bearing to inhibit axial movement of the support bearing with respect to the drive pinion.

\* \* \* \* \*